(12) United States Patent
Uchida (10) Patent No.: US 6,307,359 B1
(45) Date of Patent: Oct. 23, 2001

(54) DC-DC CONVERTER POWERED BY DOUBLED OUTPUT VOLTAGE

(75) Inventor: Takahito Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/614,143

(22) Filed: Jul. 11, 2000

(30) Foreign Application Priority Data

Jul. 14, 1999 (JP) .................................................. 11-200383

(51) Int. Cl.$^7$ ............................... G05F 1/40; H02M 3/18
(52) U.S. Cl. ............................................. 323/282; 363/59
(58) Field of Search .................................... 323/222, 268, 323/270, 271, 273, 282, 285; 363/59, 60

(56) References Cited

U.S. PATENT DOCUMENTS

| 5,572,414 | * | 11/1996 | Komori | 363/60 |
| 5,627,460 | | 5/1997 | Bazinet et al. . | |
| 5,861,735 | * | 1/1999 | Uchida | 323/271 |
| 6,154,380 | * | 11/2000 | Assow et al. | 363/61 |

FOREIGN PATENT DOCUMENTS

| 59-57290 | 4/1984 | (JP) . |
| 64-1323 | 1/1989 | (JP) . |
| 2-246771 | 10/1990 | (JP) . |
| 5-199044 | 8/1993 | (JP) . |
| 6-189529 | 7/1994 | (JP) . |
| 8-317640 | 11/1996 | (JP) . |
| 8-331843 | 12/1996 | (JP) . |
| 11-69787 | 3/1999 | (JP) . |

* cited by examiner

Primary Examiner—Matthew Nguyen
(74) Attorney, Agent, or Firm—McGinn & Gibb, PLLC (57) ABSTRACT

In a DC-DC converter including an inductor connected to an input terminal, a MOS transistor connected between the inductor and a ground terminal, a diode for supplying energy accumulated by the inductor to an output terminal, a capacitor connected between the output terminal and the ground terminal, a driver circuit for driving the MOS transistor, and a control circuit for controlling the driver circuit, a voltage doubler is provided to generate a power supply voltage approximately twice an output voltage at the output terminal and supply the power supply voltage to the driver circuit and the control circuit.

17 Claims, 6 Drawing Sheets

DC-DC CONVERTER POWERED BY DOUBLED OUTPUT VOLTAGE

BACKGROUND OF THE INVENTION

1. Field of the Invention

The present invention relates to a DC-DC converter.

2. Description of the Related Art

A prior art DC-DC converter is formed by an inductor connected to an input terminal, a MOS transistor connected between the inductor and a ground terminal, a diode for supplying energy accumulated by the inductor to an output terminal, a capacitor connected between the output terminal and the ground terminal, a driver circuit for driving the MOS transistor, and a control circuit for controlling the driver circuit. The driver circuit and the control circuit are powered by an output voltage at the output terminal. This will be explained later in detail.

In the above-described prior art DC-DC converter, however, since the gate-to-source voltage of the MOS transistor is low to increase the ON-resistance thereof, the DC-DC conversion efficiency is low.

SUMMARY OF THE INVENTION

It is an object of the present invention to provide a DC-DC converter with a large DC-DC conversion efficiency.

According to the present invention, in a DC-DC converter including an inductor connected to an input terminal, a MOS transistor connected between the inductor and a ground terminal, a diode for supplying energy accumulated by the inductor to an output terminal, a capacitor connected between the output terminal and the ground terminal, a driver circuit for driving the MOS transistor, and a control circuit for controlling the driver circuit, a voltage doubler is provided to generate a power supply voltage approximately twice an output voltage at the output terminal. Thus, the gate-to-source voltage of the MOS transistor is twice the output voltage, to decrease the ON-resistance of the MOS transistor.

BRIEF DESCRIPTION OF THE DRAWINGS

The present invention will be more clearly understood from the description set forth below, as compared with the prior art, with reference to the accompanying drawings, wherein.

DESCRIPTION OF THE PREFERRED EMBODIMENTS

Before the description of the preferred embodiments, a prior art step-up DC-DC converter will be explained with reference to FIGS. 1, 2A, 2B, and 2C.

Figure 1:
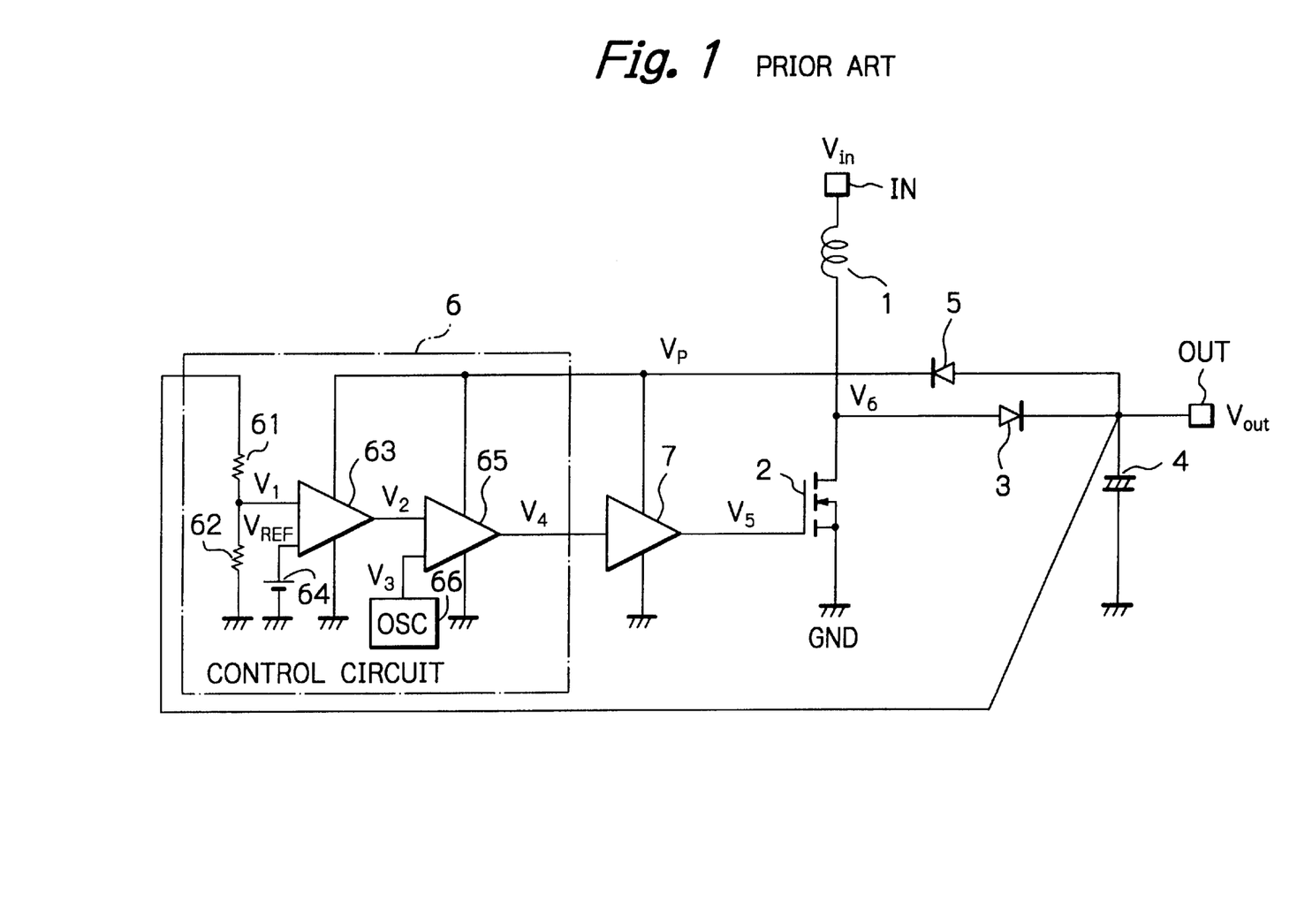
FIG. 1 is a block circuit diagram illustrating a prior art step-up DC-DC converter.

In FIG. 1, which illustrates a prior art step-up DC-DC converter, an inductor 1 and a MOS transistor 2 are connected in series between an input terminal IN whose voltage is $V_{in}$ and a ground terminal GND. Also, a diode 3 is connected between the inductor 1 and an output terminal OUT to supply energy stored in the inductor 1 to a load (not shown) connected to the output terminal OUT. Further, a capacitor 4 is connected to the output terminal OUT, so that the capacitor 4 is connected in parallel to the load.

A diode 5 is connected to the output terminal OUT to supply a power supply voltage $V_p$ to a control circuit 6 and a driver circuit 7. For example, the driver circuit 7 is constructed by a CMOS push-pull circuit.

The control circuit 6 is constructed by a voltage divider formed by resistors 61 and 62, an error amplifier circuit 63 for amplifying the difference in voltage between an output voltage $V_1$ of the voltage divider and a reference voltage $V_{REF}$ of a reference power supply source 64, and a comparator 65 for comparing an output voltage $V_2$ of the error amplifier circuit 63 with a tringular output voltage $V_3$ from an oscillator 66.

When the driver circuit 7 receives an output voltage $V_4$ from the comparator 65, the driver circuit 7 generates an output voltage $V_5$ and transmits it to the gate of the MOS transistor 2. As a result, the MOS transistor 2 is turned ON and OFF by the output voltage $V_5$, so that an output voltage $V_{out}$ at the output terminal OUT is controlled at a definite value.

The operation of the step-up DC-DC converter of FIG. 1 will be explained next with reference to FIGS. 2A, 2B and 2C.

Figure 2A:
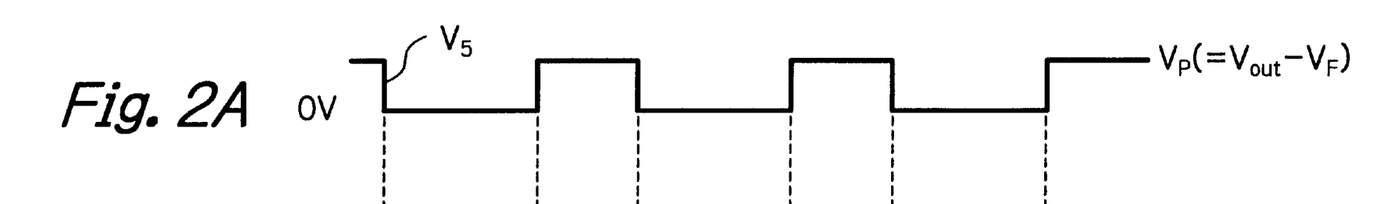
FIGS. 2A, 2B, and 2C are timing diagrams for explaining the operation of the DC-DC converter of FIG. 1.
Figure 2B:
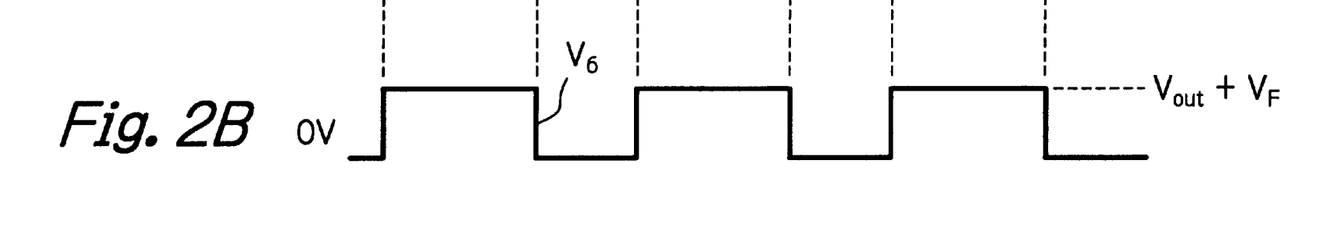

As shown in FIG. 2A, the output voltage $V_5$ of the driver circuit 7 is changed to have an amplitude of $V_p$. As a result, as shown in FIG. 2B, the drain voltage $V_6$ of the MOS transistor 2 is changed to have an amplitude of $V_{out}+V_F$.

Figure 2C:
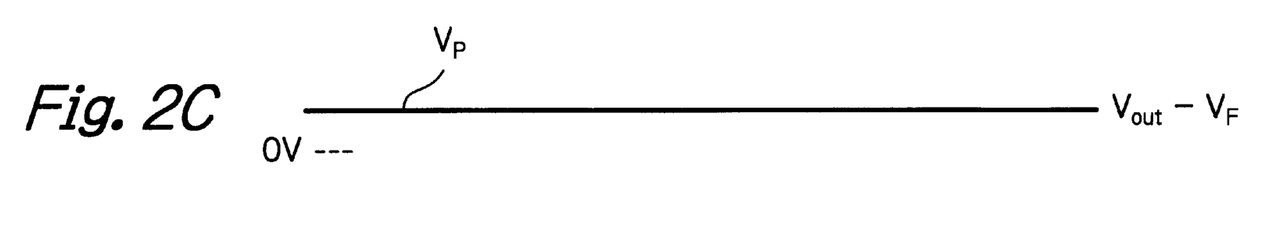

As shown in FIG. 2C, the power supply voltage $V_p$ is represented by $$V_p = V_{out} - V_F$$

where $V_F$ is a voltage drop by the diode 5.

In the step-up DC-DC converter of FIG. 1, if a current flowing through the inductor 1 is definite during a duty-on time period, the output voltage $V_{out}$ can be represented by $$V_{out} = V_{in}/(1-D) \geq V_{in} \quad (1)$$

$$D = T_{on}/(T_{on}+T_{off}) \quad (2)$$

where $T_{on}$ is an ON time of the MOS transistor 2 and $T_{off}$ is an OFF time of the MOS transistor 2.

Thus, the larger the duty ratio D, the higher the output voltage $V_{out}$.

In the step-up DC-DC converter of FIG. 1, however, since the gate-to-source voltage of the MOS transistor 2 is low ($=V_p$), the ON-resistance of the MOS transistor 2 is so large as to decrease the DC-DC conversion efficiency.

Particularly, from the formula (1), the lower the input voltage $V_{in}$, the larger the duty ratio D. Therefore, if the input voltage $V_{in}$ is low, the DC—DC conversion efficiency is further decreased.

On the other hand, when the output voltage $V_{out}$ is low, the threshold voltage of the MOS transistor 2 is increased, which also decreases the DC-DC conversion efficiency. In this case, a MOS transistor having a low ON-resistance may be used to decrease the threshold voltage of the MOS transistor 2, which, however, increases the manufacturing cost.

The DC-DC conversion efficiency of the step-up DC-DC converter of FIG. 1 is explained next in detail.

The DC-DC conversion efficiency η is represented by $$\eta = P_{out}/P_{in} \quad (3)$$

where $P_{in}$ is the input power; and $P_{out}$ is the output power.

The loss $P_{LOSS}$ of the DC-DC conversion is represented by $$P_{LOSS} = P_{in} - P_{out} = P_L + P_Q + P_D + P_C + P_R \quad (4)$$

where $P_L$ is the loss of the inductor 1;
$P_Q$ is the loss of the MOS transistor 2;
$P_D$ is the loss of the diode 3;
$P_C$ is the loss of the capacitor 4; and
$P_R$ is the loss of the other elements.

In the formula (4), the loss $P_L$ including a core (iron) loss and a copper loss depends on the material of the inductor 2 and the operation frequency of the oscillator 66, the losses $P_C$ and $P_R$ are generally smaller than the other losses, and the losses $P_L$ and $P_D$ depend on the performance of the inductor 1 and the diode 3. Therefore, the loss $P_{LOSS}$ mainly depends on the loss $P_Q$ of the MOS transistor 2 which is represented by $$P_Q = P_{SW} + P_{ON} + P_{DR} \quad (5)$$

where $P_{SW}$ is the switching loss:
$P_{ON}$ is the ON loss; and
PDR is the drive loss.

The switching loss $P_{SW}$ is definite regardless of the gate-to-source voltage $V_{GS}$ of the MOS transistor 2. Therefore, the loss $P_{LOSS}$ mainly depends on the ON loss $P_{ON}$ and the drive loss $P_{DR}$ of the MOS transistor 2.

The ON loss $P_{ON}$ is represented by $$P_{ON} = I_D^2 \,(r.m.s.) \cdot R_{ON} \quad (6)$$

where $I_D$ is the drain current of the MOS transistor 2; and
$R_{ON}$ is the ON-resistance of the MOS transistor 2. Also, the drive loss $P_{DR}$ is represented by $$P_{DR} = Q_G \cdot V_{GS} \cdot f_{OSC} \quad (7)$$

where $Q_G$ is the charge amount of the gate of the MOS transistor 2;
$V_{GS}$ is the gate-to-source voltage of the MOS transistor 2; and
$f_{OSC}$ is the operation frequency of the oscillator 66.

In order to increase DC-DC conversion efficiency η, i.e., decrease the loss $P_{LOSS}$, the sum of the ON loss $P_{ON}$ and the drive loss $P_{DR}$ has to be decreased.

In FIG. 1, if $V_{out}=5V$ and $V_F=0.5V$,
$V_P=5-=4.5V$
∴$V_{GS}=4.5V$
The drain current $I_D$ depends on the gate-to-source voltage $V_{GS}$. For example,
$I_D=1.5A$
The ON-resistance $R_{ON}$ greatly depends on the gate-to-source voltage $V_{GS}$. For example,
$R_{ON}=82$ mΩ
The charge amount $Q_G$ greatly depends on the gate-to-source voltage $V_{GS}$. For example,
$Q_6=2.1$ nC
Therefore, if $f_{OSC}=200$ kHz, $$P_{ON}=(1.5A)^2 \cdot 82\ m\Omega = 184.5\ mW \quad (8)$$

$$P_{DR}=2.1\ nC \cdot 4.5V \cdot 200\ kHz = 1.89\ mW \quad (9)$$

$$\therefore P_{ON}+P_{DR}=186.4 mW \quad (10)$$

Thus, although the drive loss $P_{DR}$ is small, the ON loss $P_{ON}$ is very large due to the large ON-resistance $R_{ON}$, which decreases the DC-DC conversion efficiency η.

Figure 3:
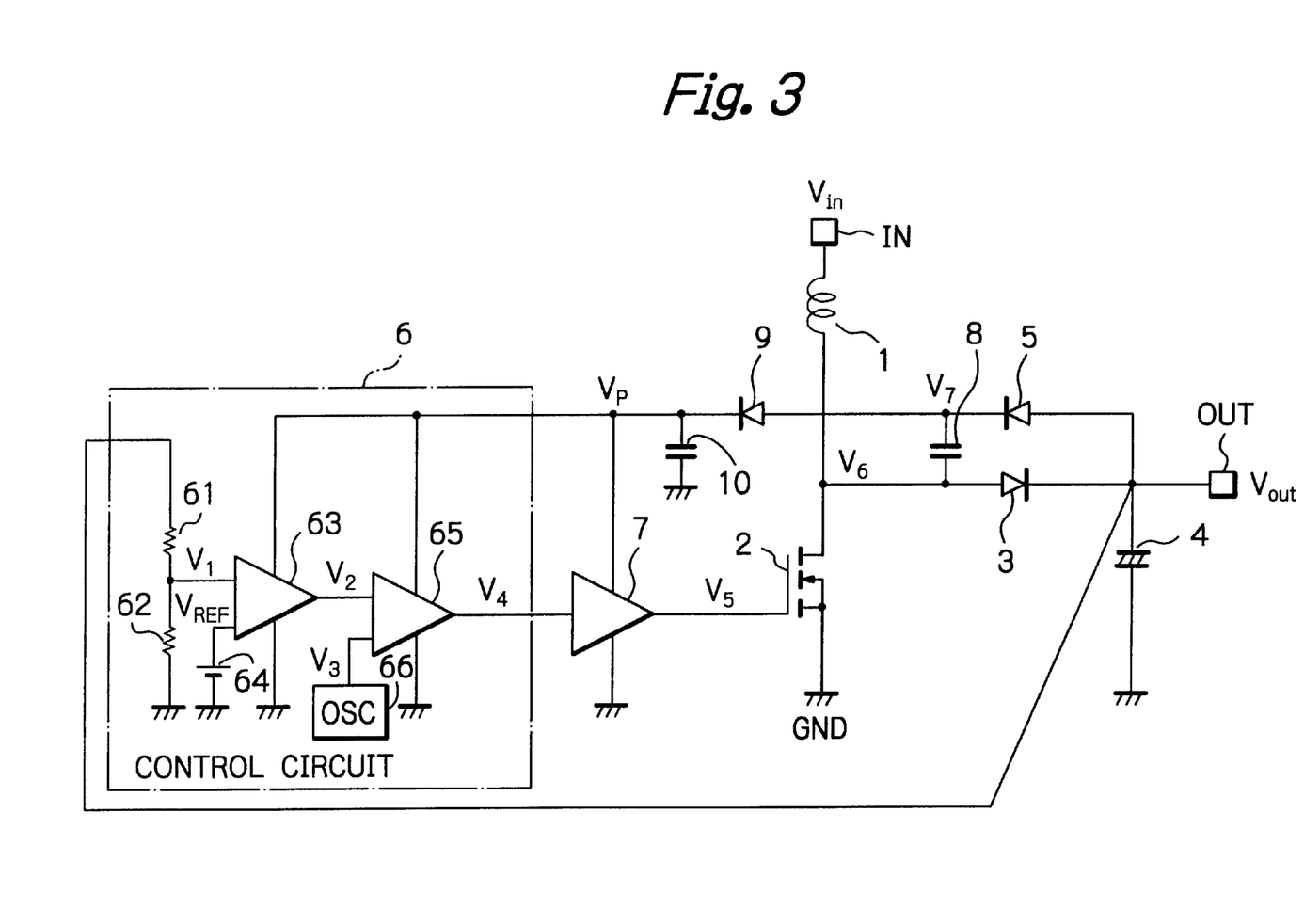
FIG. 3 is a block circuit diagram illustrating a first embodiment of the DC-DC converter according to the present invention.

In FIG. 3, which illustrates a first embodiment of the present invention, a voltage doubler formed by a capacitor 8, a diode 9 and a capacitor 10 in addition to the diode 5 is added to the elements of the step-up DC-DC converter of FIG. 1.

The operation of the step-up DC-DC converter of FIG. 3 will be explained next with reference to FIGS. 4A, 4B, 4C and 4D.

Figure 4A:
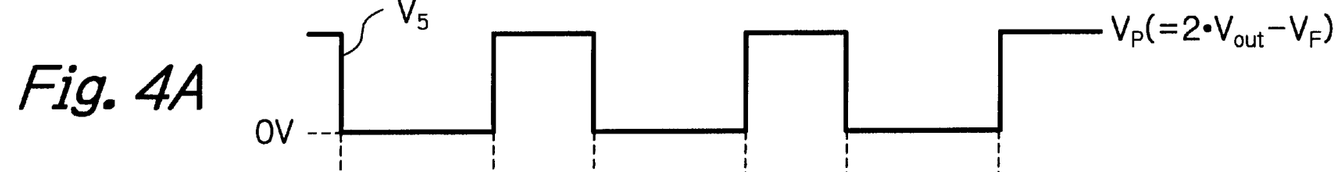
FIGS. 4A, 4B, 4C and 4D are timing diagrams for explaining the operation of the DC-DC converter of FIG. 3.
Figure 4B:
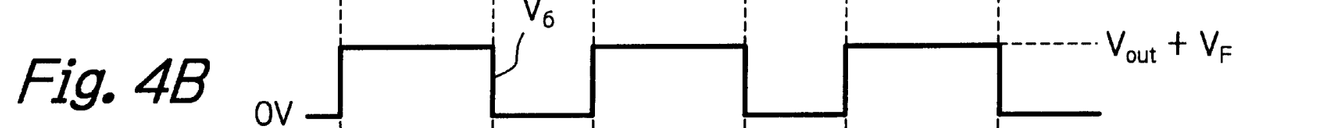

As shown in FIG. 4A, the output voltage $V_5$ of the driver circuit 7 is changed to have an amplitude of $V_P$. As a result, as shown in FIG. 4B, the drain voltage $V_6$ of the MOS transistor 2 is changed to have an amplitude of $V_{out}+V_F$.

Figure 4C:
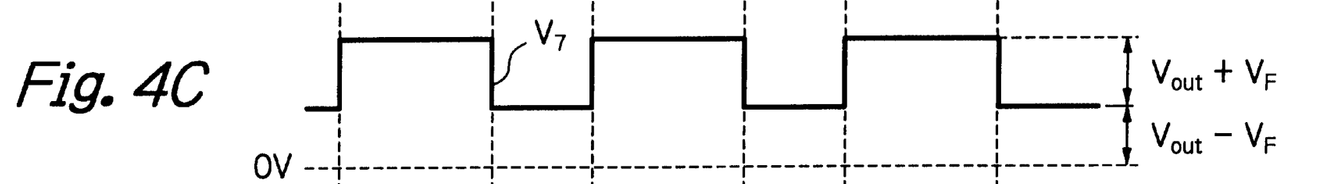

That is, when the output voltage $V_5$ of the driver circuit 7 is high (=$V_P$), the MOS transistor 2 is turned ON, so that the drain voltage $V_6$ of the MOS transistor 2 becomes low (=0V). As a result, the capacitor 8 is charged by the capacitor 4 via the diode 5 to cause the cathode voltage $V_7$ of the diode 5 to be $V_{out}-V_F$ as shown in FIG. 4C. Next, when the output voltage $V_5$ of the driver circuit 5 becomes low (=0V), the MOS transistor 2 is turned OFF, so that the drain voltage $V_6$ of the MOS transistor 2 is pulled up to $V_{out}+V_F$. As a result, the cathode voltage $V_7$ of the diode 5 is boosted by $V_{out}+V_F$, so that the cathode voltage $V_7$ of the diode 5 becomes $V_{out}-V_F+V_{out}+V_F=2V_{out}$, as shown in FIG. 4C.

Figure 4D:
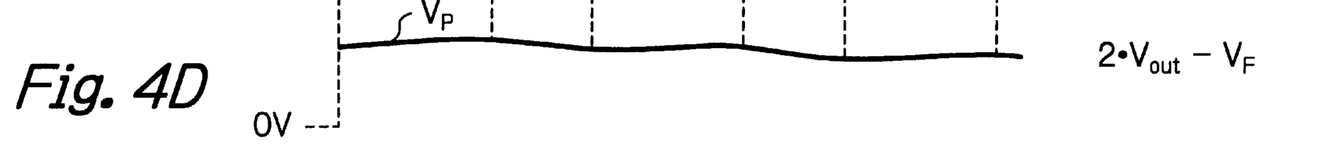

Thus, as shown in FIG. 4D, the power supply voltage $V_P$ is represented by $V_P=2 \cdot V_{out}-V_F$ where $V_F$ is a voltage drop by the diode 9.
In FIG. 3, if $V_{out}=5V$ and $V_F=0.5V$,
$V_P=2 \cdot 5-0.5=9.5V$
∴$V_{GS}=9.5V$
The drain current $I_D$ depends on the gate-to-source voltage $V_{GS}$. For example,
$I_D=1.5A$
The ON-resistance $R_{ON}$ greatly depends on the gate-to-source voltage $V_{GS}$ in the same way as the conventional MOS transistor. For example,
$R_{ON}$65 mΩ
The charge amount $Q_G$ greatly depends on the gate-to-source voltage $V_{GS}$. For example,
$Q_G=4$ nC
Therefore, if $F_{osc}=200$ kHz, $$P_{ON}=(1.5A)^2 \cdot 56\ m\Omega = 126.0\ mW \quad (8)'$$

$$P_{DR}=4\ nC \cdot 9.5V \cdot 200kHz = 7.60\ mW \quad (9)'$$

$$\therefore P_{ON}+P_{DR}=134.0\ mW \quad (10)'$$

Thus, although the drive loss $P_{DR}$ is increased by four times (see fomulae (9) and 9)', the ON loss $P_{ON}$ is decreased by 32 percent due to the large ON-resistance $R_{ON}$ (see formulae (8) and (8)'). Since the ON loss $P_{ON}$ is generally remarkably larger than the drive loss $P_{DR}$, the sum of the ON loss $P_{ON}$ and the drive loss $P_{DR}$ is remarkably decreased, which remarkably increases the DC-DC conversion efficiency η.

Figure 5:
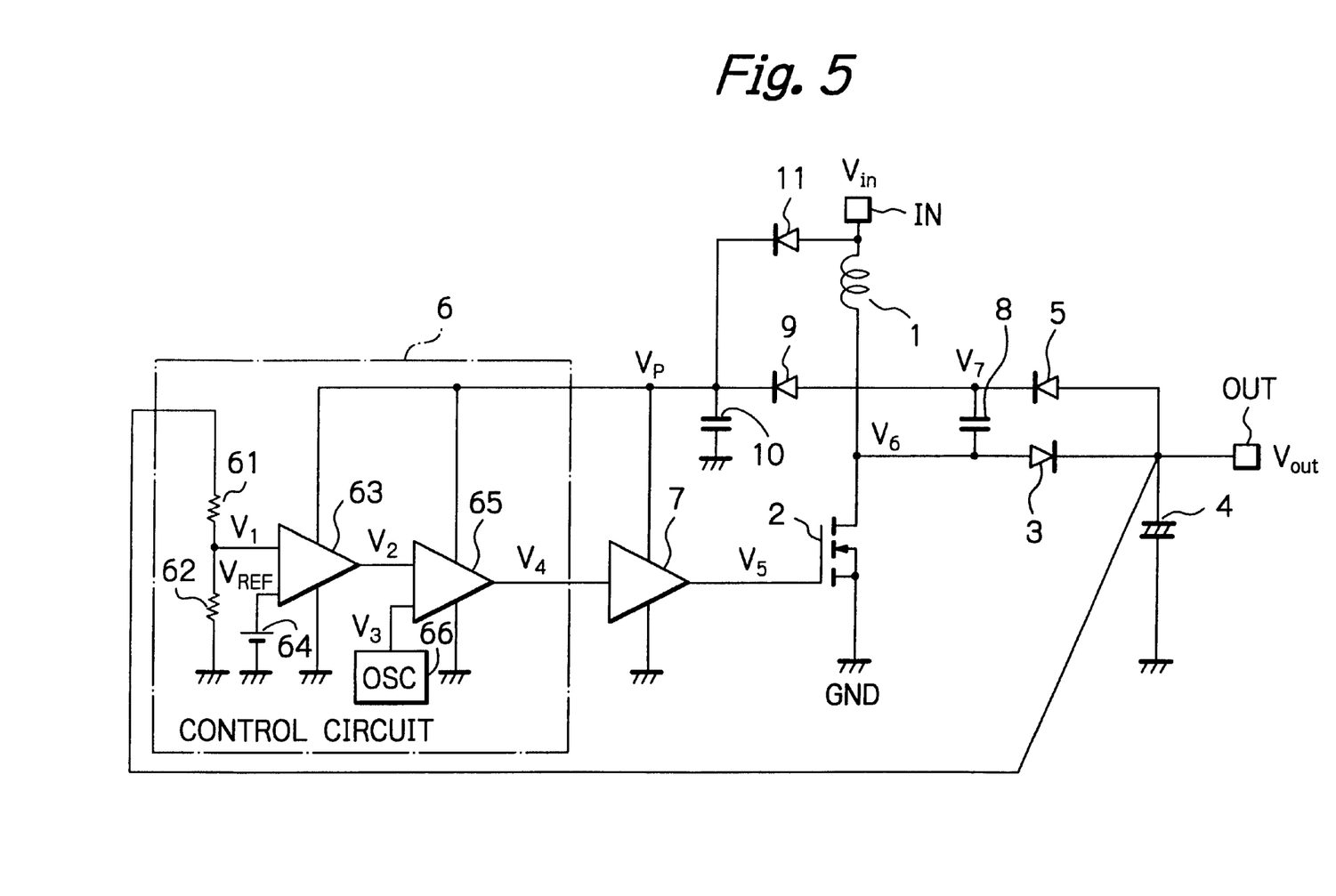
FIG. 5 is a block circuit diagram illustrating a modification of the DC-DC converter of FIG. 3.

In FIG. 5, which illustrates a modification of the DC-DC converter of FIG. 3, a diode 11 is added to the elements of the DC-DC converter of FIG. 3. In FIG. 3, in a power-up sequence, the power supply voltage $V_P$ is not sufficiently increased because of the charging operation of the diodes 8 and 9. On the other hand, in FIG. 5, in a power-up sequence, the input voltage $V_{in}$ is supplied directly via the diode 11 to the control circuit 6 and the driver circuit 7.

Figure 6:
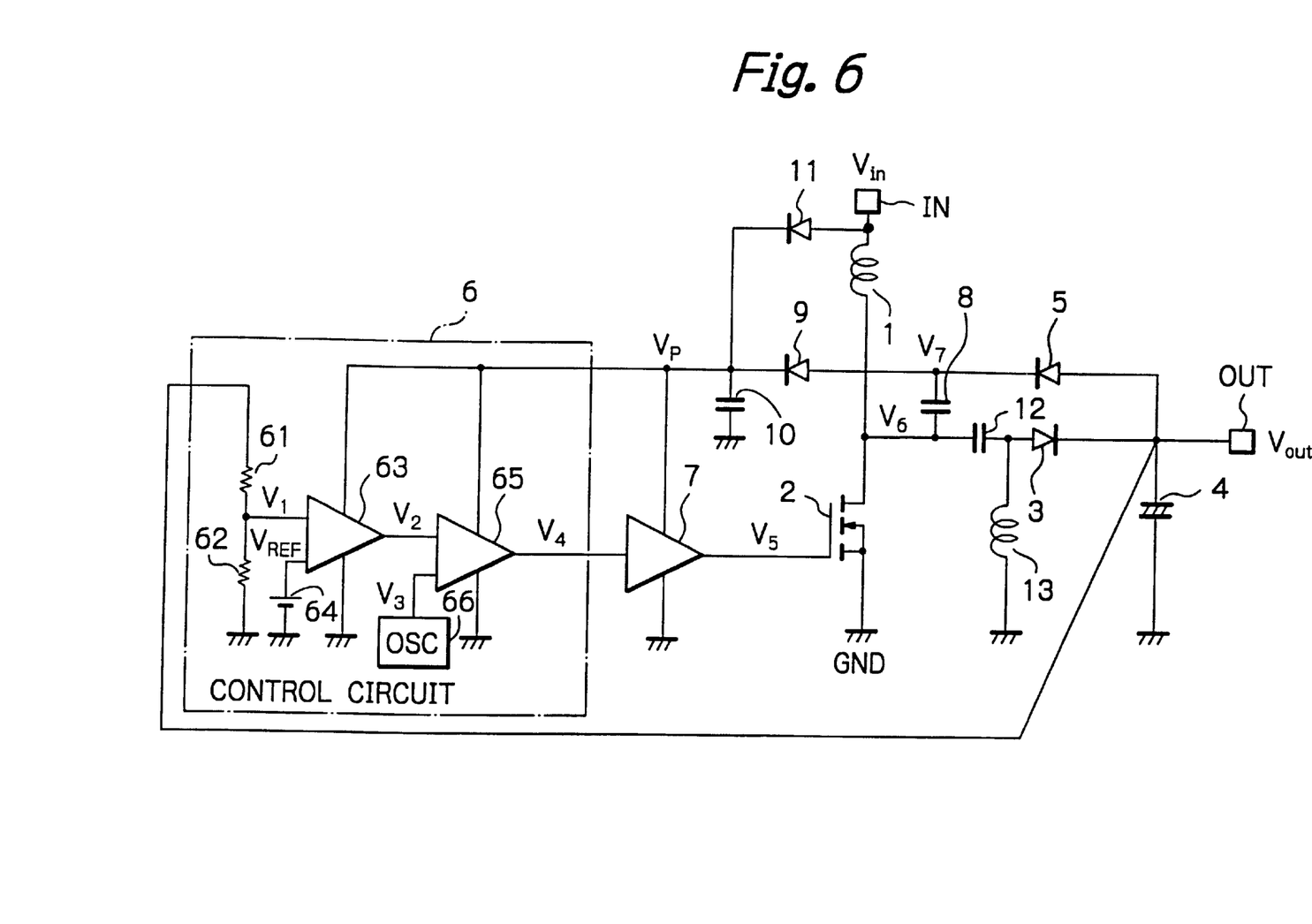
FIG. 6 is a block circuit diagram illustrating a second embodiment of the DC-DC converter according to the present invention.

In FIG. 6, which illustrates a second embodiment of the present invention, a capacitor 12 is connected between the drain of the MOS transistor 2 and the anode of the diode 3 of FIG. 5, and an inductor 13 is connected between the anode of the diode 3 and the ground. In this case, the DC-DC converter of FIG. 6 is of a step-up and step-down type. That is, during an OFF-duty period where the MOS transistor 2 is turned OFF, the capacitor 12 is charged by the inductor 1. On the other hand, during an ON-duty period where the MOS transistor 2 is turned ON, the capacitor 12 is discharged by the inductor 13. In this case, if a current flowing through the inductor 1 is defined by $I_{L1}$ and a current flowing through the inductor 13 is defined by $I_{L2}$, $$I_{L1}/I_{L2}=D/(1-D) \tag{11}$$

Also, if an input current is defined by $I_{in}$ and an output current is defined by $I_{out}$, $$V_{out}/V_{in}=I_{in}/I_{out} \tag{12}$$

Since $$I_{in}=I_{L1} \text{ and } I_{out}=I_{L2}, V_{out}/V_{in}=D/(1-D) \tag{13}$$

Therefore, if $D \geq \frac{1}{2}$, $V_{out} \geq V_{in}$ which means that the DC-DC converter of FIG. 6 is of a step-up type. On the other hand, if $D<\frac{1}{2}$, $V_{out}<V_{in}$ which means that the DC-DC converter of FIG. 6 is of a step-down type.

In FIG. 6, in a power-up sequence, the power supply voltage $V_P$ is zero due to the presence of the capacitor 12. Therefore, the diode 11 for directly supplying the input voltage $V_{in}$ to the control circuit 6 and the driver circuit 7 is indispensable.

Even in FIG. 6, since the gate-to-source voltage of the MOS transistor 2 is increased, the ON-resistance of the MOS transistor 2 can be decreased, which would increase the DC-DC conversion efficiency.

As explained hereinabove, according to the present invention, since the gate-to-source voltage of a MOS transistor for driving an inductor is increased to decrease the ON-resistance of the MOS transistor, the DC-DC conversion efficiency can be increased.

What is claimed is:

1. A DC-DC converter comprising:
   an input terminal;
   an output terminal;
   a ground terminal;
   a first inductor connected to said input terminal;
   a MOS transistor connected between said first inductor and said ground terminal;
   a first diode, connected between a drain of said MOS transistor and said output terminal, for supplying energy accumulated by said first inductor to said output terminal;
   a first capacitor connected between said output terminal and said ground terminal;
   a voltage doubler, connected to said output terminal, for generating a power supply voltage approximately twice an output voltage at said output terminal;
   a driver circuit, powered by said power supply voltage, for driving said MOS transistor; and
   a control circuit, powered by said power supply voltage, for controlling said driver circuit,
   wherein said voltage doubler is charged by said first capacitor when said MOS transistor is driven by a predetermined output voltage of said driver circuit.

2. A DC-DC converter comprising;
   an input terminal;
   an output terminal;
   a ground terminal;
   a first inductor connected to said input terminal;
   a MOS transistor connected between said first inductor and said ground terminal;
   a first diode, connected between a drain of said MOS transistor and said output terminal, for supplying energy accumulated by said first inductor to said output terminal;
   a first capacitor connected between said output terminal and said ground terminal;
   a voltage doubler, connected to said output terminal, for generating a power supply voltage approximately twice an output voltage at said output terminal;
   a driver circuit, powered by said power supply voltage, for driving said MOS transistor; and
   a control circuit, powered by said power supply voltage, for controlling said driver circuit,
   wherein said voltage doubler comprises:
   a second diode connected to said output terminal;
   a second capacitor connected between said second diode and the drain of said MOS transistor;
   a third diode connected to said second diode; and
   a third capacitor, connected between said third diode and said ground terminal, for generating said power supply voltage.

3. The DC-DC converter as set forth in claim 1, wherein said control circuit comprises:
   a voltage divider, connected to said output terminal, for dividing the output voltage at said output terminal;
   an error amplifier circuit, connected to said voltage divider, for amplifying a difference between an output voltage of said voltage divider and a reference voltage;
   an oscillator for generating a triangular output voltage; and
   a comparator, connected to said error amplifier circuit and said oscillator, for comparing an output voltage of said error amplifier circuit with said triangular output voltage to generate an output voltage for controlling said driver circuit.

4. The DC-DC converter as set forth in claim 1, further comprising:
   a second diode, connected to said input terminal, said driver circuit and said control circuit, for supplying another power supply voltage to said driver circuit and said control.

5. The DC-DC converter as set forth in claim 1, further comprising:
   a second capacitor connected between the drain of said MOS transistor and said ground terminal.

6. A DC-DC converter comprising:
   an input terminal;
   an output terminal;
   a ground terminal;
   an inductor connected to said input terminal;
   a MOS transistor connected between said inductor and said ground terminal;

a first diode, connected between a drain of said MOS transistor and said output terminal, for supplying energy accumulated by said inductor to said output terminal;

a first capacitor connected between said output terminal and said ground terminal;

a second diode connected to said output terminal;

a second capacitor connected between said second diode and the drain of said MOS transistor;

a third diode connected to said second diode;

a third capacitor, connected between said third diode and said ground terminal, for generating a power supply voltage;

a driver circuit, connected to said second capacitor and powered by said power supply voltage, for driving said MOS transistor; and a control circuit, connected to said second capacitor and powered by said power supply voltage, for controlling said driver circuit.

7. The DC-DC converter as set forth in claim 6, further comprising a fourth diode, connected between said input terminal and said third capacitor, for supplying another power supply voltage to said driver circuit and said control circuit.

8. A DC-DC converter comprising:

an input terminal;

an output terminal;

a ground terminal;

a first inductor connected to said input terminal;

a MOS transistor connected between said first inductor and said ground terminal;

a first capacitor connected to said a drain of said MOS transistor;

a second inductor, connected between said first capacitor and said ground terminal;

a first diode, connected between said first capacitor and said output terminal, for supplying energy accumulated by said first inductor and discharged by said second inductor to said output terminal;

a second capacitor connected between said output terminal and said ground terminal;

a second diode connected to said output terminal;

a third capacitor connected between said second diode and the drain of said MOS transistor;

a third diode connected to said second diode;

a fourth capacitor, connected between said third diode and said ground terminal, for generating a power supply voltage;

a fourth diode connected between said input terminal and said fourth capacitor;

a driver circuit, connected to said fourth capacitor and powered by said power supply voltage, for driving said MOS transistor; and a control circuit, connected to said fourth capacitor and powered by said power supply voltage, for controlling said driver circuit.

9. The DC-DC converter as set forth in claim 5, wherein said second capacitor is charged by said first inductor when said MOS transistor is turned OFF.

10. The DC-DC converter as set forth in claim 5, wherein said DC-DC converter comprises a step-up and step-down type of converter.

11. A converter comprising:

an input terminal;

an output terminal;

a ground terminal;

a first inductor connected to said input terminal;

a transistor connected between said first inductor and said ground terminal;

a first diode, connected between a drain of said transistor and said output terminal, for supplying energy accumulated by said first inductor to said output terminal;

a first capacitor connected between said output terminal and said ground terminal;

a voltage doubler, connected to said output terminal, for generating a power supply voltage approximately twice an output voltage at said output terminal;

a driver circuit, powered by said power supply voltage, for driving said transistor;

a control circuit, powered by said power supply voltage, for controlling said driver circuit, wherein said voltage doubler comprises:

a second diode connected to said output terminal; and a second capacitor connected between said second diode and the drain of said transistor.

12. The converter, as set forth in claim 11, further comprising:

a third diode connected to said second diode.

13. The converter, as set forth in claim 12, further comprising:

a third capacitor, connected between said third diode and said ground terminal, for generating said power supply voltage.

14. The converter as set forth in claim 13, further comprising:

a fourth diode, connected to said input terminal, said driver circuit and said control circuit, for supplying another power supply voltage to said driver circuit and said control circuit.

15. The converter as set forth in claim 13, further comprising:

a fourth capacitor connected between the drain of said MOS transistor and said ground terminal.

16. The converter as set forth in claim 15, wherein said fourth capacitor is charged by said first inductor when said MOS transistor is turned OFF.

17. The converter as set forth in claim 15, wherein said converter comprises a step-up and step-down type of converter.

* * * * *